United States Patent
Policicchio et al.

(10) Patent No.: US 8,763,197 B2
(45) Date of Patent: Jul. 1, 2014

(54) CLEANING ARTICLE WITH NON-PLANAR ELEMENT IN PLACE OF STRIPS

(75) Inventors: Nicola John Policicchio, Mason, OH (US); Larry L. Huston, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 347 days.

(21) Appl. No.: 12/958,586

(22) Filed: Dec. 2, 2010

(65) Prior Publication Data

US 2011/0131746 A1 Jun. 9, 2011

(30) Foreign Application Priority Data

Dec. 4, 2009 (CA) ..................................... 2685904

(51) Int. Cl.
A47L 13/20 (2006.01)

(52) U.S. Cl.
USPC .......................... 15/210.1; 15/209.1; 15/229.1

(58) Field of Classification Search
USPC ............... 15/208–210.1, 228, 229.1, 229.11, 15/223–224, 226
See application file for complete search history.

(56) References Cited

U.S. PATENT DOCUMENTS

| | | | |
|---|---|---|---|
| 823,725 | A | 6/1906 | Hayden et al. |
| 5,953,784 | A | 9/1999 | Suzuki et al. |
| D489,537 | S | 5/2004 | Wong et al. |
| 6,797,357 | B2 | 9/2004 | Fereshtehkhou et al. |
| 6,813,801 | B2 | 11/2004 | Tanaka et al. |
| D499,887 | S | 12/2004 | Wong et al. |
| 6,936,330 | B2 | 8/2005 | Fereshtehkhou et al. |
| 6,963,594 | B2 | 11/2005 | Manico et al. |
| 6,984,615 | B2 | 1/2006 | Kenmochi et al. |
| 7,228,587 | B2 | 6/2007 | Tanaka et al. |
| 7,231,685 | B2 | 6/2007 | Tanaka et al. |
| 7,234,193 | B2 | 6/2007 | Tanaka et al. |
| 7,234,914 | B2 | 6/2007 | Usab et al. |
| 7,237,296 | B2 | 7/2007 | Tanaka et al. |
| 7,237,297 | B2 | 7/2007 | Tanaka et al. |
| 7,243,391 | B2 | 7/2007 | Tanaka et al. |
| 7,251,851 | B2 | 8/2007 | Lin et al. |
| 7,302,729 | B2 | 12/2007 | Tanaka et al. |
| 7,302,730 | B2 | 12/2007 | Tanaka et al. |
| 7,566,671 | B2 | 7/2009 | Hoadley et al. |
| 2006/0101601 | A1 | 5/2006 | Fujiwara et al. |

(Continued)

FOREIGN PATENT DOCUMENTS

| CN | 2808051 Y | 8/2006 |
|---|---|---|
| CN | 1961811 A | 5/2007 |

(Continued)

OTHER PUBLICATIONS

Computer generated English translation of JP 2005-007094 A, Suda, Jan. 2005.*

*Primary Examiner* — Laura C Guidotti

(74) *Attorney, Agent, or Firm* — Larry L. Huston; Steven W. Miller

(57) ABSTRACT

A plural sided cleaning article optionally removably attachable to a handle. The cleaning article may have a layered construction. The construction may comprise a sheet, to accommodate optional and removable attachment to a handle, intermediate tow fibers, and a non-planar structure extending outwardly from the side of the tow fibers opposite the sheet. This arrangement avoids the disadvantage of strips according to the prior art while increasing the surface area of the tow fibers.

12 Claims, 4 Drawing Sheets

(56) References Cited

U.S. PATENT DOCUMENTS

2007/0212157 A1 9/2007 Hoadley et al.
2008/0028560 A1 2/2008 Policicchio et al.
2008/0032577 A1 2/2008 Policicchio et al.
2010/0037410 A1 2/2010 Tsuchiya et al.

FOREIGN PATENT DOCUMENTS

| EP | 1832217 | * | 9/2007 | ............... A47L 13/16 |
| JP | 11221184 A2 | | 8/1999 | |
| JP | 2005-007094 A | * | 1/2005 | ............... A47L 13/20 |

* cited by examiner

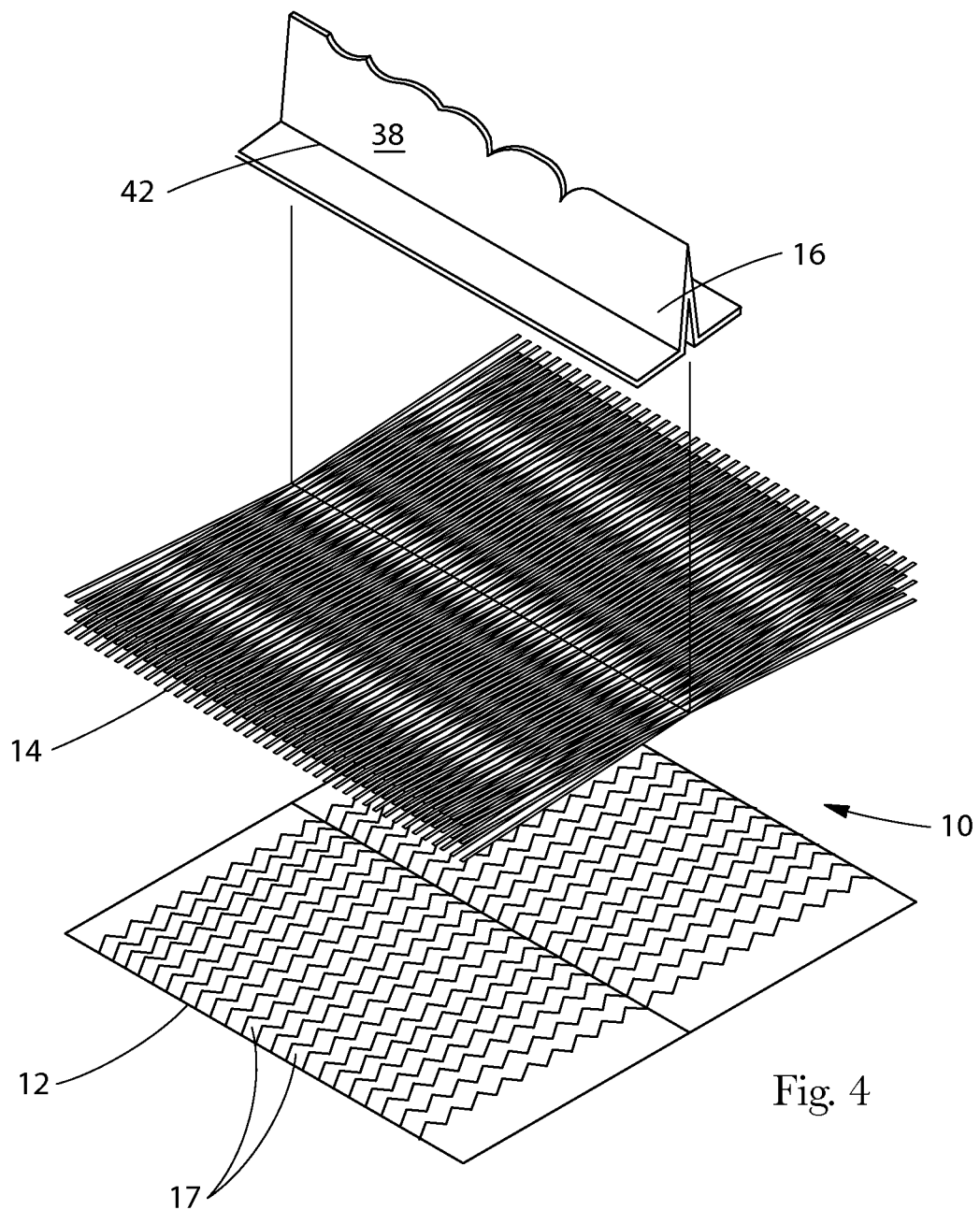

CLEANING ARTICLE WITH NON-PLANAR ELEMENT IN PLACE OF STRIPS

BACKGROUND OF THE INVENTION

Various cleaning articles have been created for dusting and light cleaning. For example, cloth rags and paper towels used dry or wetted with polishing and cleaning compositions have been used on relatively flat surfaces. But, rags and paper towels are problematic for reasons such as hygiene (the user's hand may touch chemicals, dirt or the surface during cleaning), reach (it may be difficult to insert the user's hand with the rag or paper towel into hard-to-reach places) and inconvenience (cleaning between closely-spaced articles typically requires moving the articles).

To overcome the problems associated with using rags and paper towels, various dust gathering devices having feathers, lamb's wool, and synthetic fibers brushes have been utilized for more than a century, as illustrated by U.S. Pat. No. 823,725 issued in 1906 to Hayden. Such dust gathering devices can be expensive to manufacture, and as such are designed to be cleaned and reused. One problem associated with a reusable dust gathering device is that such dust gathering devices may not hold or trap dust very well. Soiled, reusable devices are typically cleaned via shaking or through other mechanical agitation. This process is not entirely satisfactory as it requires an extra step during, interrupting and/or following the cleaning process. Furthermore, the attempted restoration of the device may not be successful, allowing redeposition of the previously collected dust.

To address the problems experienced with reusable dust gathering devices, disposable dust gathering devices have been developed which have limited re-usability. These disposable dust gathering devices may include brush portions made of synthetic fiber bundles, called tow fibers, attached to a nonwoven sheet. The disposable cleaning article may be used for one job (several square meters of surface) and discarded, or may be restored and re-used for more jobs, then discarded. Traditional cleaning articles including feather dusters, cloths, string mops, strip mops and the like, are not disposable for purposes of this invention.

Such devices may be made, for example, according to U.S. Pat. Nos. 6,813,801; 6,968,591; 6,984,615; 7,228,587; 7,231,685; 7,234,193; 7,234,914; 7,237,296; 7,237,297; 7,243,391; 7,302,729; 7,302,730; and/or 7,334,287 (having a common related application). The patents in this linage have a common feature—strips laterally extending from both sides of a generally planar article. The strips serve the purpose of increasing surface area of intermediate tow fibers by promoting deformation of the tow fibers out of the plane of the article. This approach has the attendant problem that excessive material is used for the strips. If the strips have the same length, taken from the longitudinal axis, as the tow fibers, the strips can interfere with the tow fibers fully contacting the target surface.

The problem of strips in such cleaning articles is exacerbated in U.S. Pat. No. 5,953,784 which teaches strips extending not only from both sides of the cloth, but also from the front. One attempt to overcome this problem is found in U.S. Pat. No. 7,566,671 which does not use laterally extending strips. However, this attempt has the drawback that the cleaning implement thereof only cleans on one side of the implement—not both as taught by the lineage of U.S. Pat. No. 6,813,801.

An attempt to overcome the single-sided cleaning disadvantage of the aforementioned U.S. Pat. No. 7,566,671 is found in U.S. Pat. No. 7,251,851 which teaches a spiral duster. However, this approach starts with a construction similar to that of the aforementioned U.S. Pat. No. 6,813,801 lineage and U.S. Pat. No. 823,725—leading the intended solution back to the same approach which started the problem 100 years ago.

Thus, there is a need for a two-sided cleaning article which uses less material than found in the known art. The need further must provide for advantageous use of the tow fibers to gather and retain dust.

SUMMARY OF THE INVENTION

The invention comprises a cleaning article. The cleaning article is optionally removably attachable to a handle. The cleaning article comprises at least one layer of tow fibers. The tow fibers extend laterally outward from a spine. The layer of tow fibers has first and second opposed faces. A sheet is disposed on a first face of the tow fibers and a nonplanar structure extends out of the plane of the second face of the layer of tow fibers. The non-planar structure is free of laterally extending strips. However, the cleaning article may comprises a plurality of strips on the sheet disposed on the first face of the tow fibers.

BRIEF DESCRIPTION OF THE DRAWINGS

FIG. 4 is a schematic perspective view of an alternative embodiment of the cleaning article according to the present invention having a panel extending substantially parallel to the Z direction.

DETAILED DESCRIPTION OF THE INVENTION

Figure 1:
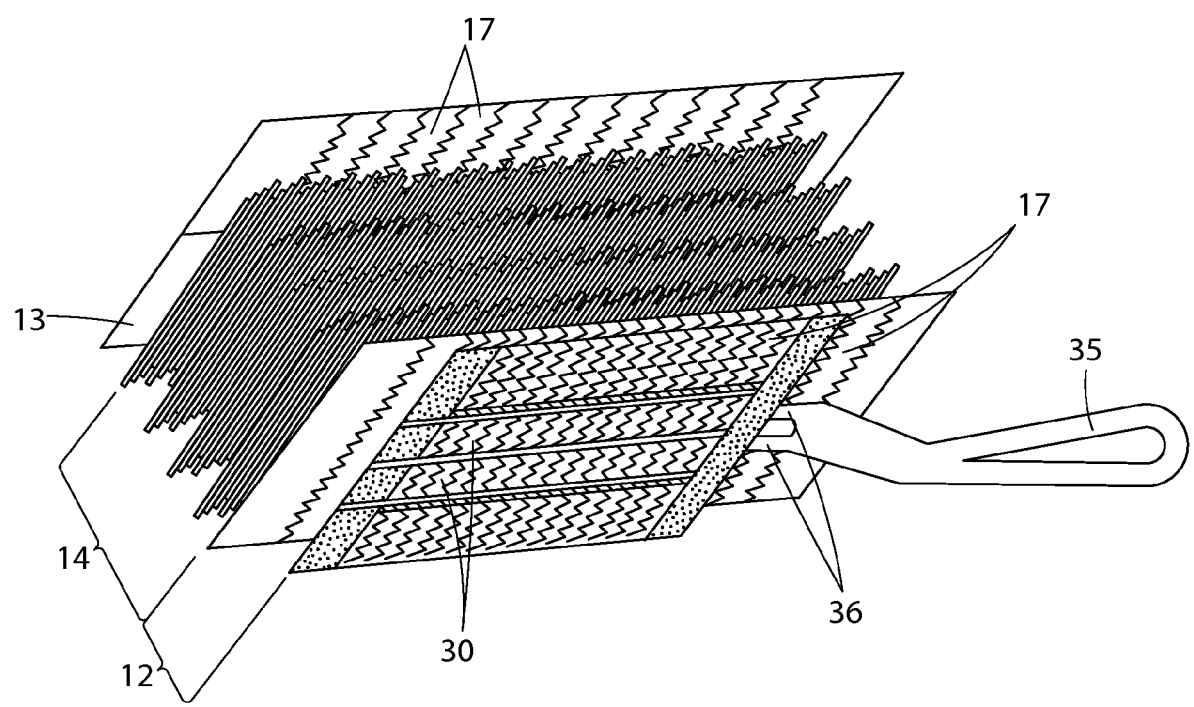
FIG. 1 is a schematic exploded perspective view of a cleaning article according to the prior art and having strips on both out laminae. The cleaning article is shown upside down from its commonly used position for clarity.

Referring to FIG. 1, the cleaning article 10 may be generally elongate, having a longitudinal axis, although other shapes are contemplated and feasible. The cleaning article 10 may be removably attachable to a handle 35 or may be used without a handle.

As shown in FIG. 1, the cleaning article 10 according to the prior art may be thought of as having three lamina 12, 14, 13 joined in face-to-face-relationship. The laminae comprise a tow fiber lamina 14, intermediate two laminae of sheets 12, 13 with strips 17. The tow fiber lamina 14 is shown to comprise four layers, although one of skill will understand from one to several layers are feasible and contemplated.

An attachment system may provide for removable attachment of the cleaning article 10 to a suitable handle 35. The cleaning article 10 attachment system and optional complementary handle attachment may comprise adhesive joining, cohesive joining, mechanical engagement, etc. One common attachment system comprises sleeves 30 into which the tines 36 of the handle may be inserted. The sleeves 30 may be disposed on an outer lamina 12.

Figure 2A:
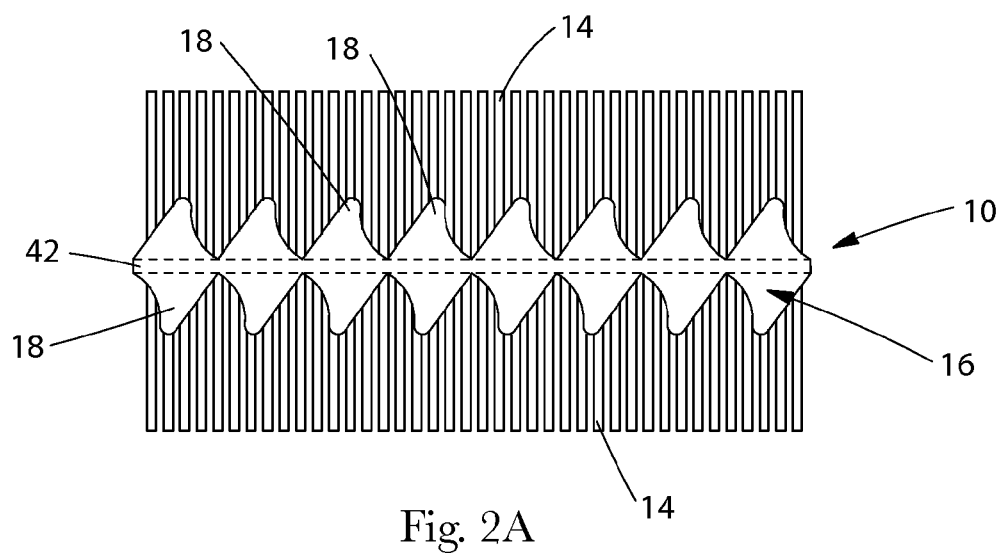
FIG. 2A is a schematic top plan view of a cleaning article according to the present invention, and having a plurality of tabs having asymmetric sides, alternatingly extending to either side of the longitudinal centerline and having a 1:1 aspect ratio.
Figure 2:
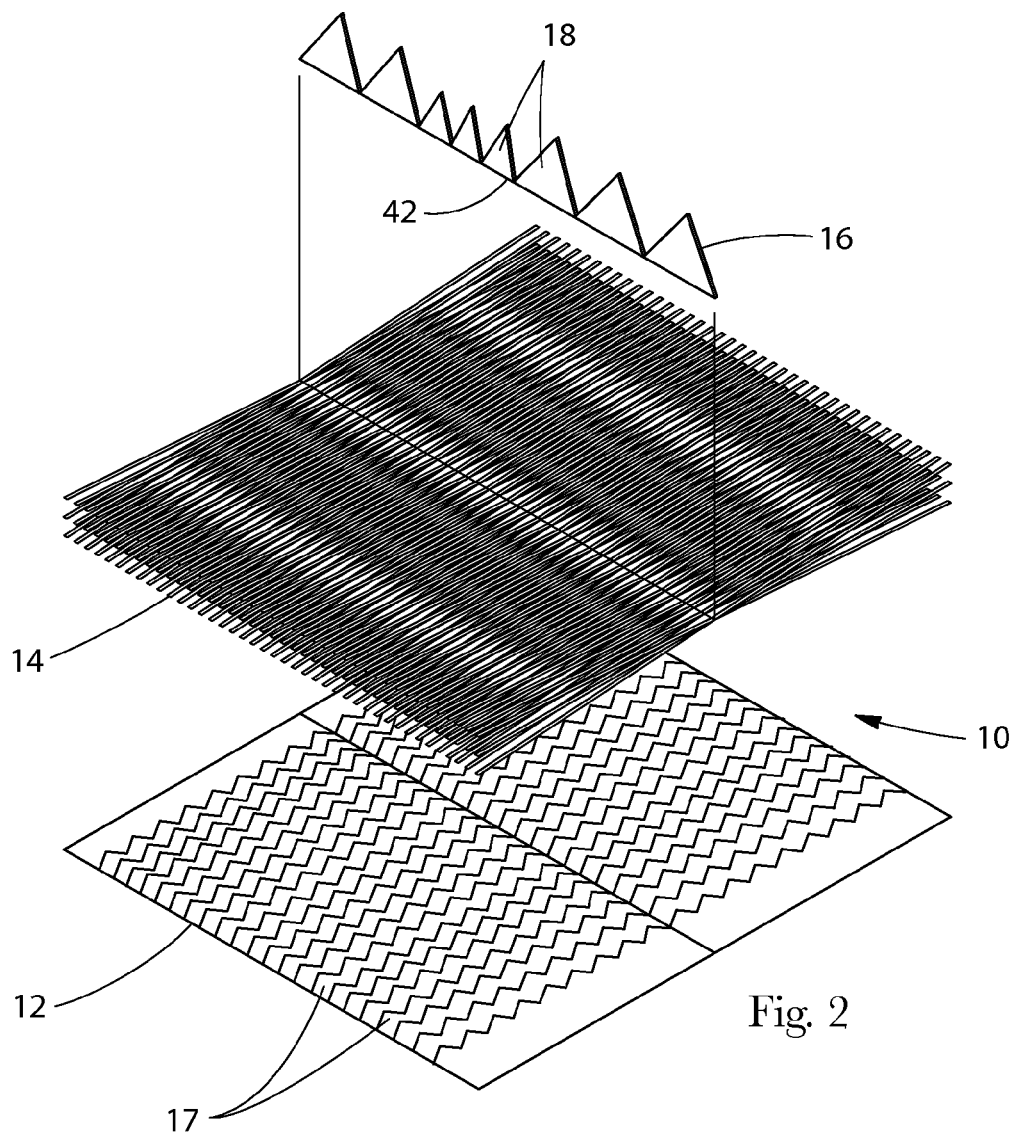
FIG. 2 is a schematic exploded perspective view of a cleaning article according to the present invention, and having a plurality of straight-sided tabs extending coincident the longitudinal centerline in a single line. The tabs are shown to have two different sizes.

Referring to FIGS. 2 and 2A, the cleaning article 10 according to the present invention does not have a lamina 13 of strips 17, opposite the handle 35 attachment system. Strips 17 on the sheet 12 having the attachments system are optional.

The cleaning article 10 of the present invention may be thought of as having plural laminae joined in face-to-face relationship. The laminae may comprise a sheet 12, a tow layer(s) 14 and a non-planar structure 16.

The z-direction of the cleaning article 10 is the direction perpendicular to the sheet 12 which is typically closest to the handle (if present) of the cleaning article 10, the XY plane is defined as the plane defined by the sheet 12 and is typically perpendicular to the z-direction. The length of the cleaning article 10, etc. is taken in the longitudinal direction. The width of the cleaning article 10 corresponds to the direction perpendicular to the length and disposed within the plane of the sheet 12. The length and width of strips, as discussed below, are taken however, in the transverse and longitudinal directions, respectively. The thickness is defined as the dimension in the z-direction.

The sheet 12 may have an outwardly facing preferential cleaning side and a second inwardly facing attachment side opposed thereto. The sheet 12 may comprise a nonwoven sheet. Suitable nonwovens may be made according to commonly assigned U.S. Pat. Nos. 6,797,357; 6,936,330, D489,537 and/or D499,887.

Adjacent the sheet 12 may be a compressible and/or deformable second lamina of fibers 14. The second lamina may comprise tow fibers 14. The tow fiber lamina 14 may be joined to the sheet 12 in face-to-face relationship. The tow fiber lamina 14 may be suitable for directly contacting the target surface during cleaning.

The tow fibers 14 may be synthetic. As used herein "bundle fibers" and/or "tow" refer to fibers comprising synthetic polymers including polyester, polypropylene, polyethylene and cellulose materials including cellulose acetate and mixtures thereof manufactured wherein the individual fibers are relatively long strands manufactured in bundles. The bundle fibers may be defined as any fibers having distinct end points and at least about 1 cm in length. The cleaning article 10 of the present invention may further comprise an absorbent core (not shown).

Adjacent the tow fiber lamina 14 may be a non-planar structure 16. The non-planar structure 16 extends out of the XY plane, in the z-direction. Significantly, the non-planar structure 16 extends in the z-direction in its normal state, i.e. as intended to be upon manufacture and after planar alignment caused by unintended deformation due to packaging or handling has been restored.

The non-planar structure 16 of the cleaning article 10 does not comprise strips 17, as known from the prior art. As used herein, strips refer to cantilevered elements extending laterally outwardly from the longitudinal centerline of the article 10, and having a length (taken in the transverse direction) greater than the corresponding width (as taken in the longitudinal direction).

The strips lie within the XY plane as intended by manufacture, although may be deformed out of the XY plane due to fluffing before use, and/or deformations which occur in use due to movement against the target surface.

The sheet 12, fibrous layer 14 and non-planar structure 16 may be joined together by thermal bonding, autogenous bonding, ultrasonic bonding, heat sealing, adhesive or other means known in the art. The sheet 12 may comprise two plies, joined together in face-to-face relationship. The sheet 12, fibrous layer 14 and non-planar structure 16 may be bonded in a pattern which provides a central spine 42 parallel the longitudinal axis.

The bonding pattern joining the two plies may be provided in a pattern which provides a sleeve complementary to and able to receive the tines of the handle, if used with the cleaning article of the present invention. Particularly, the bonding may be provided in a pattern which is generally longitudinally oriented, so that the tines may be inserted into the sleeve created between adjacent bonds.

The bond pattern may provide a central spine 42. Outboard of the central spine 42, the bond pattern may comprise one or more continuous or discontinuous bond sites. The space between the central spine 42 bond and the outboard bonds may create a sleeve 30 for receiving a tine 36 of the handle 35. If desired, the sheet 12 may be shrunk/strained in the cross-direction. This process can provide rugosities or wrinkles in sheet 12. The rugosities/wrinkles space apart the plies of sheet 12, allowing for easier insertion of the tines into the sleeve 30, if so desired.

The non-planar structure may comprise several different forms. With continuing reference to FIGS. 2 and 2A, the non-planar structure 16 provides the benefit that portions of the tow fibers 14 may cling thereto and purposefully be deformed out of the XY plane. Such deformation increases the surface area and interstitial spacing of the tow fibers 14, allowing for greater capture of debris and insertion into smaller spaces on the target surface.

The nonplanar structure 16 may comprise a plurality of tabs 18. The tabs 18 may have a proximal end juxtaposed with the longitudinal centerline and a distal end extending outwardly there from with a vector component parallel to the Z direction. The tabs 18 have a length to width aspect ratio less than one and are thereby distinguishable from the strips of the prior art. The tabs 18 provide the benefit over the strips of the prior art of utilizing less material. Unexpectedly the tabs 18 provide further of promoting greater deformation of tow fibers 14 in the Z direction that occurs with the strips of the prior art.

If desired, the distal end of the tabs 18 may be convex, tapered, pointed or have any reasonable shape which is non-perendicular to the length direction of the tab 18. This geometry increases the available surface area of the distal end of the tab 18, making it more likely for tow fibers 14 to cling thereto and moved in the Z direction. The tabs 18 need not extend parallel to the Z direction. The tabs 18 may extend out of the XY plane, at an acute angle. If desired, the tabs 18 may alternatingly extend to either side of the longitudinal centerline. This arrangement provides the benefit that tow fibers 14 on either side of the longitudinal centerline are more likely to cling to the tabs 18, promoting more uniform deformation of the tow fibers 14 across the width of the cleaning article 10.

Figure 3A:
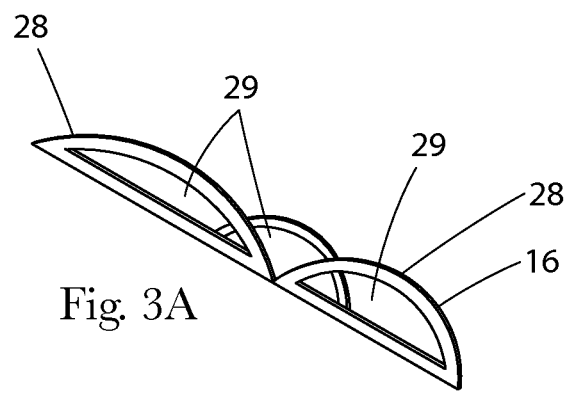
FIG. 3A is a schematic perspective view of a spine usable with the embodiment of FIG. 3 and having a plurality of arches.
Figure 3:
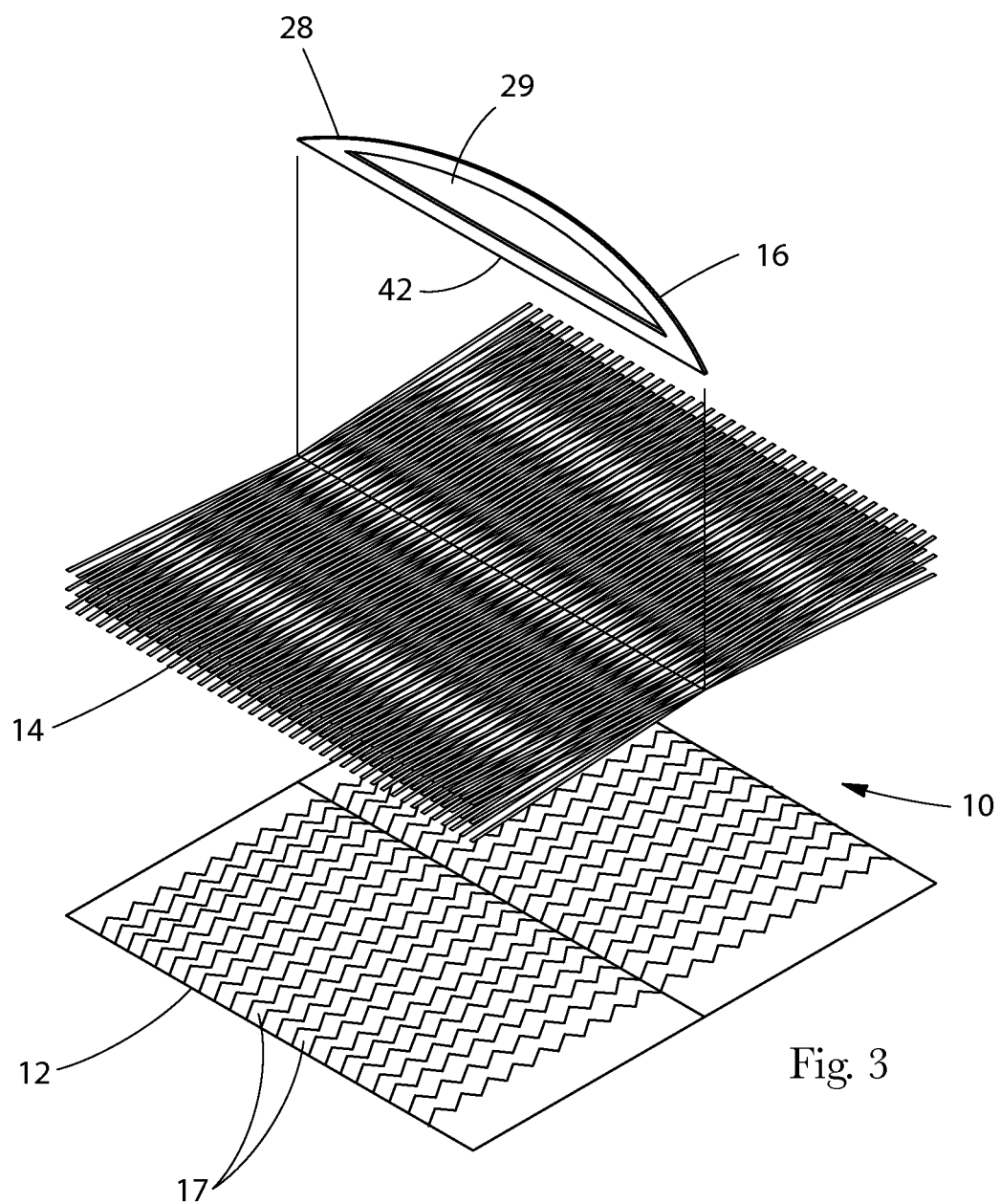
FIG. 3 is a schematic perspective view of an alternative embodiment of the cleaning article according to the present invention having a longitudinal extending arch extending out of the XY plane.

Referring to FIGS. 3 and 3A, the nonplanar structure 16 may resemble an arch 28. Each end of the arch 28 may be joined to the tow fibers 14 at a position juxtaposed with the spine 42. Underneath the arch 28, is an open space 29 into which tow fibers 14 may deflect. The tow fibers 14 moving into the open space 29 may become intertwined with the arch 28, causing the Z direction deflection, desired with the present invention. The arrangement of FIG. 2 provides the benefit that greater Z direction deflection is promoted at the center of the cleaning article 10, tapering to lesser deflection at the ends of cleaning article 10. This arrangement provides the benefit of allowing the cleaning article 10 to be adapted to move into tighter spaces of the target surface.

Of course, one of skill will recognize that plural arches 28 may be utilized as the non-planar structure 16. The plural arches 28 maybe disposed in series, and/or in parallel. If the arches 28 are disposed in series, they may have varying heights (or lengths) and the Z direction to provide for various degrees of deflection of tow fibers 14 in the Z direction. Likewise, if the arches 28 are disposed in parallel, the arches 28 may have the same or different heights (or lengths) to provide for like or different degrees of engagement of the tow fibers 14. Furthermore, parallel arches 28 may be oriented outwardly from or inwardly towards the spine 42.

Referring to FIG. 4, the nonplanar structure 16 may comprise a panel 38 sticking outwardly from the XY plane of the tow fibers 14. The panel 38 may be cantilevered from a proximal end juxtaposed with the spine 42. The proximal end maybe straight, and in a degenerate case parallel to the longitudinal axis, or, alternatively, maybe serpentine, etc. The distal end of the panel 38 extends only slightly away from the proximal end, to honor the aspect ratio being less than one as discussed above with respect to the tabs 18. Thus, the length of pane 38 is less than one half of the width of the cleaning article 10 and further is less than the distance from the longitudinal axis to either side of the cleaning article 10. The distal end may be serrated, etc.

If desired plural panels 38 may be utilized. The plural panels 38 may have a common proximal end and extend outwardly therefrom to have distal ends disposed on either side of the longitudinal center line. Alternatively, the plural panels 38 may have proximal ends spaced apart in the lateral direction. The plural panels may be of like or different geometry.

The distal end of the one or more panels 38 may be serrated, provide one or more concavities, crenulations, convexities, or have other shapes which lengthen the distal end relative to a straight line parallel to the longitudinal axis. This geometry provides the benefit of more area for tow fibers 14 to cling to.

Any of the first, second, and third laminae 12, 14, 16 may be completely or partially coated with adhesive, wax, Newtonian or non-Newtonian oils or a combination thereof, in order to improve cleaning and increase retention of absorbed debris. If desired, the cleaning article 10 may optionally be used with a cleaning solution or other solution usable for other purposes such as treating the surface for appearance or disinfectant, etc. The cleaning solution may be pre-applied to the cleaning article 10, creating a pre-moistened cleaning article 10 or may be contained within a separate reservoir for dosing onto the cleaning article 10 and/or target surface. The cleaning solution may comprise a majority water, and at least about 0.5, 2, 5 or 10% solids, or at least about 30% or 50% aqueous solvents, non-aqueous solutions or mixtures thereof (all by weight).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article for removable attachment to a handle, and having a longitudinal centerline, said article comprising:
    at least one layer of tow fibers, said tow fibers extending laterally outward from a spine, said layer further having first and second opposed faces;
    a generally planar sheet disposed on a first face of said at least one layer of tow fibers; and
    a nonplanar structure extending out of said second face of said at least one layer of tow fibers, said non-planar structure being free of laterally extending strips,
    said nonplanar structure comprising a plurality of tabs, said tabs having a proximal end coincident said longitudinal centerline, a distal end being concave or pointed, said tabs having a length to width aspect ratio of less than or equal to one.

2. A cleaning article according to claim 1 wherein said sheet is a nonwoven sheet and said sheet further comprises a plurality of strips.

3. A cleaning article according to claim 2 wherein said article has a longitudinal centerline, and said strips extend outwardly from a proximal end juxtaposed with said longitudinal centerline in a direction generally perpendicular to said longitudinal centerline.

4. A cleaning article according to claim 1 wherein said tabs alternatingly extend in opposite directions along said longitudinal centerline.

5. A cleaning article for removable attachment to a handle and having a longitudinal centerline, said article comprising:
    at least one layer of tow fibers, said tow fibers extending laterally outwardly from a spine, said layer further having first and second opposed faces and defining a plane;
    a generally planar sheet disposed on a first face of said at least one layer of tow fibers; and
    a nonplanar structure extending out of said second face of said at least one layer of tow fibers, said non-planar structure being free of laterally extending strips, said nonplanar structure comprising at least one loop, said loop having two attached ends juxtaposed with said longitudinal centerline and an intermediate portion disposed remotely from said at least one layer of tow fibers.

6. A cleaning article according to claim 5 wherein said loop is substantially parallel said longitudinal centerline.

7. A cleaning article according to claim 5 comprising a plurality of loops.

8. A cleaning article for removing dust from a target surface, said article having a longitudinal axis and comprising:
    at least one layer of tow fibers, said layer having first and second opposed faces, said second face defining a plane;
    a nonwoven sheet disposed on a first face of said at least one layer; and a first panel and a second panel, each said panel extending from a respective proximal end to a respective distal edge, said distal edge being out of the plane of said second face of said tow fibers, the distal edge of one or both panels having serrations, concavities, crenulations or convexities.

9. A cleaning article according to claim 8 wherein said first panel comprises a first panel extending from a proximal end juxtaposed with and substantially parallel to said longitudinal axis, said first panel having a length taken parallel to said proximal end and a width taken perpendicular to said at least one layer of tow fibers, said width of said first panel being less than said length of said first panel.

10. A cleaning article according to claim 9, wherein said second panel has a length taken parallel to said proximal end and a width taken perpendicular to said at least one layer of tow fibers, said width of said second panel being less than said length of said second panel.

11. A cleaning article according to claim 9, wherein one said panel has a distal end being generally concave-shaped.

12. A cleaning article for removable attachment to a handle, and having a longitudinal centerline, said article comprising:

at least one layer of tow fibers, said tow fibers extending laterally outward from a spine, said layer further having first and second opposed faces;

a generally planar sheet disposed on a first face of said at least one layer of tow fibers; and a nonplanar structure extending out of said second face of said at least one layer of tow fibers, said non-planar structure being free of laterally extending strips, said nonplanar structure comprising a first panel and a second panel, each said panel extending from a respective proximal end to a respective distal end, said distal end being out of the plane of said second face of said tow fibers wherein said first panel and said second panel have a respective first panel distal end and a second panel distal end, said first panel and said second panel being joined together along a line intermediate said proximal ends and said distal ends of said first and said second panels or said distal ends of said first panel and said second panel being joined together.

* * * * *